United States Patent [19]

Varnovitsky

[11] Patent Number: 4,580,064

[45] Date of Patent: Apr. 1, 1986

[54] METHOD FOR GENERATING PULSE WIDTH MODULATED CONTROL SIGNALS

[75] Inventor: Marlen Varnovitsky, Schenectady, N.Y.

[73] Assignee: General Electric Company, Schenectady, N.Y.

[21] Appl. No.: 723,228

[22] Filed: Apr. 15, 1985

Related U.S. Application Data

[63] Continuation of Ser. No. 384,694, Jun. 3, 1982, abandoned.

[51] Int. Cl.$^4$ .................. H03K 3/017; H03K 9/08; H02M 3/335
[52] U.S. Cl. ................................ 307/265; 329/106; 363/26
[58] Field of Search ................ 307/265; 329/106; 363/26, 41; 318/599

[56] References Cited

U.S. PATENT DOCUMENTS

| | | | |
|---|---|---|---|
| 2,762,002 | 9/1956 | Umpleby | 318/599 |
| 3,253,228 | 5/1966 | Montner | 363/41 |
| 3,418,433 | 12/1968 | Hodge | 329/106 |
| 3,440,566 | 4/1969 | Swanson | 363/41 |
| 4,244,015 | 1/1981 | Beebe | 363/41 |
| 4,263,501 | 4/1981 | Wilhelmson | 318/599 |
| 4,306,181 | 12/1981 | Welbarn | 318/599 |

OTHER PUBLICATIONS

"A Microcomputer-Based Control Signal Generator for a Three-Phase Switching Inverter", IEEE Transaction on Industry Applications, vol. IA-19, No. 2, Mar.-/Apr. 1983, pp. 228-234, M. Varnovitsky.

Primary Examiner—Stanley D. Miller
Assistant Examiner—B. P. Davis
Attorney, Agent, or Firm—Donald R. Campbell; James C. Davis, Jr.; Paul R. Webb, II

[57] ABSTRACT

A method for generating pulse width modulated (PWM) control signals from a reference waveform uses a unipolar timing waveform to modulate the reference waveform thereby avoiding the need for lock-out intervals to prevent shoot-through in power inverters supplied by the PWM control signals. Further, a sinusoidal reference waveform is approximated by a trapezoid, simplifying the computation of switching points located at intersections between the reference and timing waveforms.

4 Claims, 7 Drawing Figures

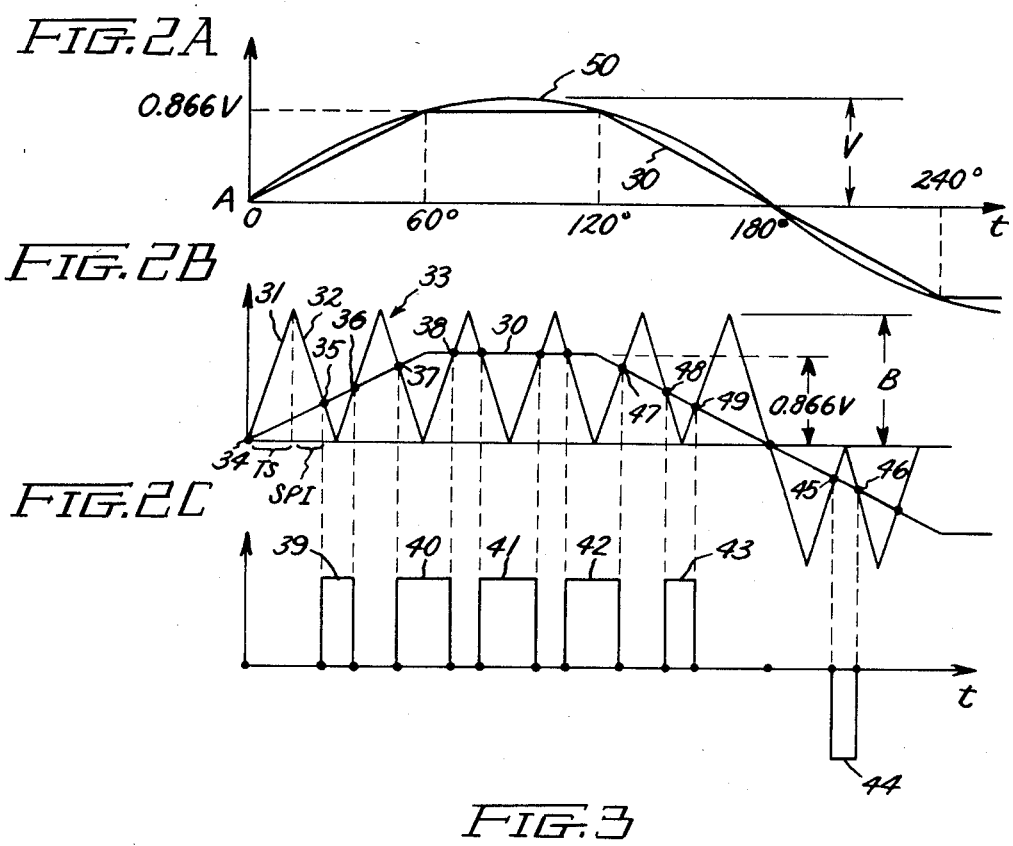
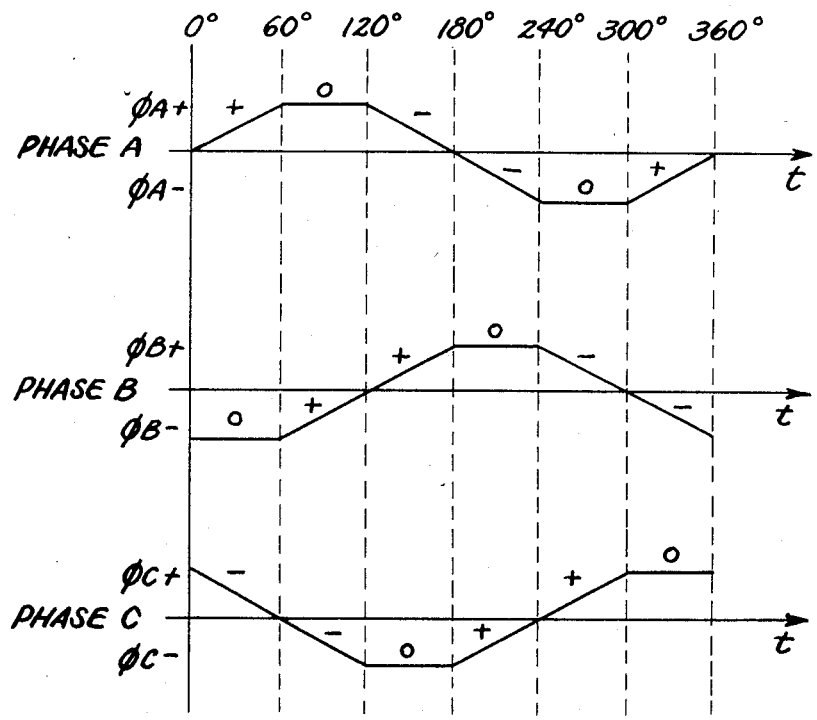

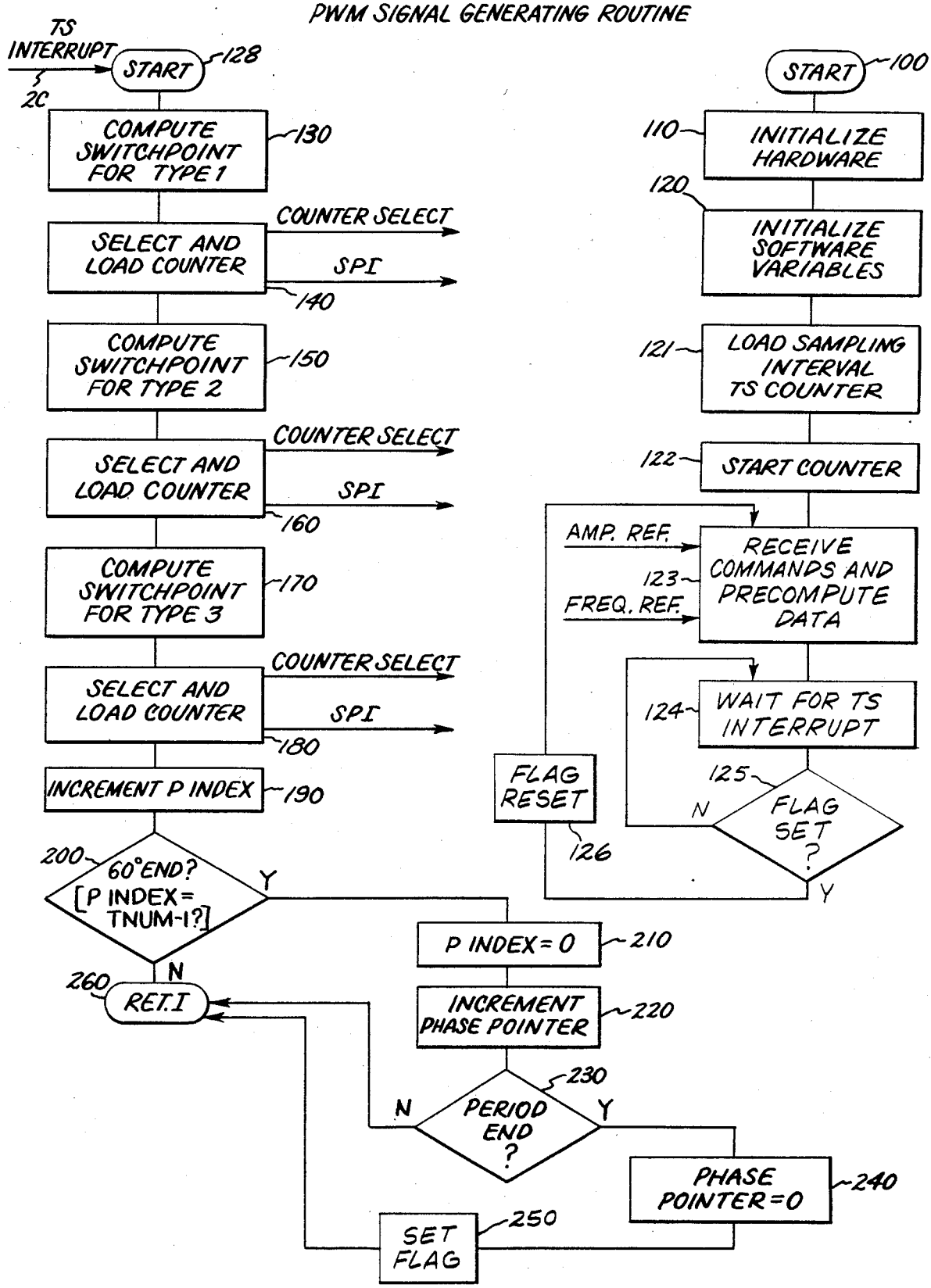

METHOD FOR GENERATING PULSE WIDTH MODULATED CONTROL SIGNALS

This applicaion is a continuation of application Ser. No. 384,694, filed June 3, 1982, now abandoned.

BACKGROUND OF THE INVENTION

This invention relates to pulse width modulated (PWM) control signals. More particularly, it relates to a method for producing such signals which signals may be used for a power conditioning load requiring variable amplitude and variable frequency control signals, as for instance, a DC to AC converter or power inverter used to supply power to a variable speed AC drive.

Control input signals to power inverters are typically in the form of PWM switching or control signals selected to ensure that AC power supplied to the load of the power inverter output approximates a reference analog signal, typically a sine wave. PWM inverters approximate sine-wave output waveforms by switching the power elements at a rate higher than the frequency of the reference signal. There must be a sufficient number of pulses to prevent an increase of lower order harmonics and undesirable fluctuations in the power inverter output current. The pulses must also be precisely positioned along the time axis. If there are variations in this positioning, the harmonic content of the overall PWM signal will change, causing additional power losses associated with a higher harmonic content.

A present method of modulating a reference signal employs a bipolar triangular timing wave which has two different polarities during each of its periods. The bipolar PWM control signal generated by this method contains both a positive and a negative portion during each period thereof, and thus requires that the output phase terminal, coupled to the power inverter DC supply through the switches of the power inverter, be instantaneously switched from the positive voltage of the inverter DC bus to the negative voltage of the inverter DC bus and vice versa, at the zero crossing of the control signal. However, there are physical limitations to the response time of any switching element, as for example bipolar transistors or thyristors, used in an inverter circuit. These switching elements require a finite time from the receipt of a turn-off command in which to dissipate base charge and thus to stop conducting, while they will start conducting in a much shorter time from the receipt of a turn-on command. Thus it is possible to have both switches in a leg or phase of the power inverter conducting simultaneously, which will create a short circuit or shoot-through across the DC voltage buses of the inverter. In order to avoid this shoot-through condition, it is necessary to provide a lock-out time interval during which both switches in a leg or phase of the inverter bridge are rendered nonconductive before the transition from conducting to non-conducting mode or vice versa is permitted. These lockout intervals not only complicate the control circuitry, but also add additional undesirable harmonics to the output voltage of the inverter, which causes additional power losses associated with the higher harmonic content in the load of the inverter.

SUMMARY OF THE INVENTION

In accordance with the present invention, a method for generating a pulse width modulated control signal from a reference waveform comprises modulating the reference waveform with a timing waveform having a higher frequency and the same polarity (unipolar) as the reference waveform generating a train of pulses, each pulse occurring at the start of each interval, respectively, in which the magnitude of the timing waveform is less than the magnitude of the reference waveform, and terminating at the end of each interval, respectively.

Further, with a triangular timing waveform and a sinusoidal reference waveform, a trapezoidal approximation of the sinusoidal reference waveform permits calculation of the points of intersection between the timing and the approximated reference waveform to be simplified.

An object of the present invention is to provide a method for generating a pulse width modulated control signal for power conditioning apparatus wherein the need for generation of lock-out intervals for the power conditioning apparatus is avoided.

Another object is to provide a method for generating a pulse width modulated control signal wherein calculation of the intercept points between reference and timing waveforms is simplified.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DESCRIPTION OF THE DRAWING

FIGS. 2A-2C are graphs of the relative timing of a reference waveform, a timing waveform and PWM control signals in accordance with the present invention.

FIG. 3 is a graph showing the timing relationship in a 3-phase system of the trapezoidal approximation of a sinusoidal reference waveform in accordance with the present invention.

FIG. 4 is a logic flow diagram of a method for generating PWM control signals in a system including a microprocessor in accordance with the present invention.

DETAILED DESCRIPTION

Figure 1A:
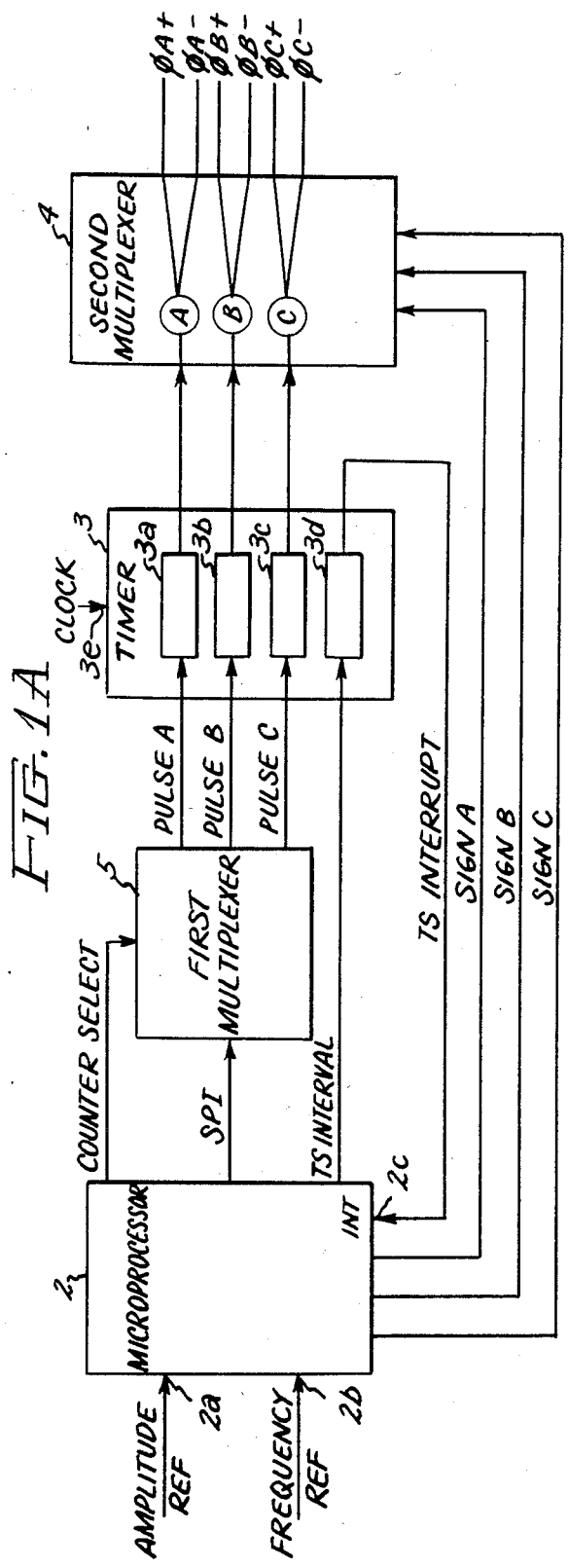
FIGS. 1A and 1B jointly are part schematic and part block diagrams of a system for generating PWM control signals in accordance with the present invention.
Figure 1B:
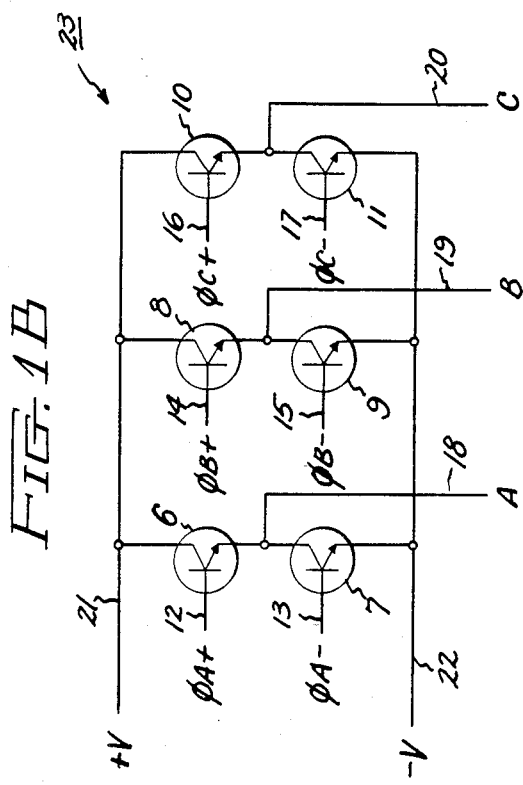

Shown in FIGS. 1A and 1B is a system for generating PWM control signals in accordance with the present invention. The pulse width modulate (PWM) control signals may be used for example, to control the output of an electronic power inverter or DC to AC converter 23 (FIG. 1B) or any other load requiring a variable amplitude and a variable frequency. Further, there is no limit to the number of phases which can be controlled with the method of the present invention, as the method can be extended analogously to handle a multiphase system having more than three phases, but a 3-phase system is descriped herein because of its general applicability. Electronic power inverter means 23 (FIG. 1B), shown for a 3-phase system, comprises switching elements 6-11 such as transistors, a positive DC voltage (+V) on a bus 21 and a negative voltage (−V) on a bus 22. Generally, the positive and negative voltages have the same magnitude if the neutral voltage of the power source is the ground reference of the source. Bases 12-17 of transistors 6-11, respectively, are coupled to PWM control signal outputs of the second multiplexer means 4, which may be a CD 4053B type integrated circuit or the like manufactured by RCA. Collectors of transistors 6, 8 and 10 are coupled to bus 21, emitters of transistors 7, 9 and 11 are coupled to bus 22, and emitters of transistors 6, 8 and 10 are coupled to collectors of transistors 7, 9, 11, respectively. Phase outputs 18, 19 and 20 for phases A, B and C, respectively, are coupled to the junction between devices 6 and 7, 8 and 9, and 10 and 11, respectively.

PWM control signals available at outputs of second multiplexer means 4 bias transistors 6-11 into either conducting or non-conducting modes. For example, when control signal $\phi A+$ is above the transistor 6 positive bias threshold, transistor 6 is biased into the conducting mode and voltage +V, neglecting any drop across transistor 6, is supplied to phase A output 18. Voltage +V will remain at phase A output 18 until transistor 6 is biase into into a nonconducting mode as a result of control signal $\phi A+$ falling below the transistor 6 positive bias threshold, at which time no voltage will be present at phase A output 18. Thus, a pulse will have appeared at phase A output 18 having an amplitude substantially equal to voltage + and a width equal to the conduction time interval of transistor 6. When control signal $\phi A-$ is above the transistor 7 positive bias threshold, transistor 7 is biased into the conducting mode and voltage −V, neglecting any drop across transistor 7, is supplied to phase A output 18. Voltage −V will remain at phase A output 18 until transistor 7 is biased into a non-conducting mode as a result of control signal $\phi A-$ falling below the transistor 7 positive bias threshold, at which time no voltage will be present at phase A output 18. Thus, a pulse will have appeared at phase A output 18 having an amplitude substantially equal to voltage −V and a width equal to the conduction time interval of transistor 7. Analogous operation is provided for phase B output 19 and phase C output 20 and any other phases which may be provided.

Commands for the generation of control signals $\phi A+$ and $\phi A-$ in the for of sign A, sign B and sign C signal voltages and all other control signals are provided to second multiplexer 4 by microprocessor means 2 which may be an 8051 type integrated circuit or the like manufactured by Intel, Inc., Santa Clara, Calif. It is important that both transistors in the same leg or phase, such as transistors 6 and 7 in phase A, are not biased into the conduction mode at the same time as this creates a short circuit or shoot-through path between bus 21 and bus 22 and shorts voltage +V to voltage −V. Prevention of short circuit or shoot-through requires that lockout intervals be used, as hereinbefore explained, when a bipolar timing wave is used to generate PWM control signals. With the present invention, this problem is obviated by supplying PWM control signals 39-44, shown in FIG. 2C, to switching elements 6 or 7, for example, in a phase or leg of power inverter 23 of FIG. 1B. The PWM control signals bias only one switching element of the phase into a conducting mode during each half period of reference waveform 50, shown in FIG. 2A, during which time the other switching element of the phase is biased into a non-conducting mode. The time interval from the end of the last pulse 43 of a half period of reference waveform 50, which pulse is provided to switching element 6 of FIG. 1B and the beginning of the first pulse 44 in the next half period of reference waveform 50, which pulse is provided to switching element 7 of FIG. 1B provides sufficient lock-out time, without the need of additional hardware or timing controls, to prevent a shoot-through condition in the inverter.

Microprocessor means 2 also supplies the TS interval in the form of a binary encoded quantity to timer means 3 as an input to timer or counter 3d thereof. The TS interval represents one half-period of timing waveform 33. In addition, the switching point interval (SPI) in the form of a binary encoded quantity and counter select signal are provided to first multiplexer means 5, which may be of the same type as second multiplexer means 4, from microprocessor means 2. The switching point interval is the time between the start of the TS interval and the intersection of the timing and reference waveforms. The counter select signal determines onto which of pulse A, pulse B or pulse C lines, coupled to inputs of timers or counters 3a-3c of timer means 3, respectively, the switching point interval is placed.

First multiplexer means 5 makes the switching point interval signal available on the pulse A, pulse B or pulse C line to be provided to timer means 3 as inputs to timers or counters 3a, 3b and 3c respectively, thereof. The positioning of the switching point interval on the proper output line from first multiplexer 5 is determined by the status of the counter select signal. Output signals from timers 3a-3c in the form of alternative voltage levels are provided to second multiplexer means 4 which makes the output signals from timer means 3 available as PWM control signals in response to the status of the sign A, sign B and sign C signal inputs thereto. An interface unit (not shown) may be provided, if necessary, to condition the PWM control signal outputs of second multiplexer means 4, to be compatible with the respective inputs of inverter 23.

Alternatively, the functions of first multiplexer means 5 may be implemented internally in microprocessor means 2. In such a case, the pulse A, pulse B and pulse C lines would be coupled to output ports of microprocessor means 2 and the positioning of the switching point interval at the proper port and thereby onto the proper pulse A, pulse B or pulse C line would be determined by a counter select table located in the memory portion (not shown) of microprocessor means 2. The counter select table would keep track of in which 60° interval the program was operating.

Referring to FIGS. 2A-2C, the PWM control signals 39-44 supplied by second multiplexer 4 in FIG. 1A are produced by comparing a mathematically derived trapezoidal waveform 30 approximation of a reference waveform 50, supplied as a binary encoded quantity to input 2b of microprocessor 2, and having the desired output frequency, with a mathematically-generated unipolar timing waveform 33, having a peak magnitude and frequency typically greater than those of the trapezoidal waveform 30, respectively. Timing waveforms are typically triangular in shape, corresponding to a double-edge modulation, although in the case of single-edge modulation, they would assume a sawtooth configuration. Reference waveform 50 can be of any shape, but for applications in which low harmonic content is desired, the shape is generally sinusoidal. When the magnitude of the timing waveform 33 is less than that of the trapezoidal waveform 30, i.e. the timing waveform 33 forms troughs under the trapezoidal waveform 30, PWM pulses or control signals 39-44 are produced. These signals 39-44 have the same polarity as the trapezoidal waveform 30 and a width equal to the interval between adjacent intercept or switching points on successive timing pulses such as the interval between points 35, 36 located at the intersection of the trapezoidal and timing waveforms. Although only six PWM pulses 39-44 are shown, it is to be understood that any number of pulses may be analogously generated. The amplitude of PWM control signals 39-44 is selected to be compatible with the apparatus being supplied with the PWM control signals. For example, in the case of the transistor power inverter, shown in FIG. 1B, the pulse amplitude is selected to ensure that each transistor is biased into the conduction mode when a PWM control signal is applied to the base thereof.

Trapezoidal waveform 30 constitutes a linear approximation of sinusoidal waveform 50 having the upper vertices at the 60° and 120° values of the sine wave and the lower vertices at the 0° and 180° values of the sine wave. The contribution of this approximation to the harmonic content of the PWM control signal is small, but the trapezoidal approximation 30 of reference waveform 50 simplifies the computational generation of PWM control signals 39-43, when using a sawtooth or triangular timing waveform 33, since the determination of the intercept of the timing 33 and trapezoidal 30 waveforms is the resolution of the point of intersection of two straight lines.

Further, by using a unipolar timing waveform 33, automatic lock-out or non-conduction time to prevent shoot-through is provided at the zero crossing of the reference wave after which the PWM control signals reverse polarity, as between pulse 43 and pulse 44. This automatic lock-out interval obviates the need to provide a separate lock-out interval along with the associated hardware and timing controls as is necessary when a bipolar timing waveform is used.

A change in the amplitude of trapezoid 30 will vary the width of PWM control signals 39-44 which will change the amplitude of the fundamental harmonic of the train of PWM control signals 39-44. The amplitude of trapezoid waveform 30 is indicative of the amplitude of the desired output voltage of the inverter (FIG. 1B). There must be a sufficient number of PWM control signals 39-44, which requires that the frequency of the timing waveform 33 must be substantially greater than the frequency of reference waveform 50, in order to prevent a fluctuating current from the inverter. Also, PWM control signals 39-44 must be precisely positioned along the time (t) axis since any variation in position will change the harmonic content of the output waveform from the inverter, producing unwanted harmonics and additional undesirable losses in the load (not shown) on inverter 23 in FIG. 1B, due to the extra harmonics.

Referring to FIG. 3 which shows curves of a trapezoidal approximation of sinusoidal reference waveforms for a 3-phase system, it is evident that in any 60° interval there are only three slopes or shapes which the approximating curve may assume, i.e. increasing (+) or type 1, no change (0) or type 2 and decreasing (−) or type 3. These slopes of the trapezoidal curves occur during each 60° interval in a different phase. Thus, it is relatively simple to calculate the positions of switching points such as points 34-38 at intersections of the trapezoidal 30 and timing waveforms 33, shown in FIG. 2B, for each of type 1, type 2 and type 3 cases during each 60° interval and to have the results of the calculations provided to the proper phase of the apparatus. Microprocessor 2(FIG. 1A) through the counter select signal and the switching point interval signal controls the timing and synchronization of the pulse train to position the calculated results in their correct relative positions by keeping track of which 60° interval in the reference signal period is being considered.

The triangular timing or modulating waveform 33 shown in FIG. 2B may typically have a frequency of 1000 Hz. The period is thus 1000 microseconds and the one-half period or sampling interval TS, determined graphically by dropping a perpendicular from the apex of trangular timing waveform 33 to the abscissa, is 500 microseconds.

A reference or target frequency is provided to input 2b and a reference or target amplitude is provided to input 2a of microprocessor means 2 in FIG. 1A in the form of a binary encoded quantity from a source not shown, but which may be any source which provides a signal compatible with microprocessor means 2. The target frequency and amplitude are parameters of the desired output signal which the PWM control signals are employed to approximate. The target amplitude determines how high the trapezoidal approximation 30 (FIG. 2A) of the reference waveform 50 will be and the target frequency determines the width of the bases of trapezoid 30 and thereby the number of sampling intervals per one-sixth of the reference waveform 50 period.

Referring to FIG. 4, a logic flow diagram for a program of the microprocessor shown in FIG. 1A is illustrated. For convenience, in the discussion of the operation of the present invention, specific values will be assigned to certain parameters. It is to be understood that the invention is not limited to the values assigned and that other values may be assigned without departing from the scope of the present invention.

The program is interrupt driven and begins at start step 100 at initial turn-on and then performs the initialization of hardware at step 110 which includes resetting the timers 3a-3d of FIG. 1A.

After hardware initialization step 110 the program performs software initialization step 120 by establishing values for internal variables and storing the reference frequency and amplitude in the memory (not shown) of the microprocessor. A phase pointer counter, which keeps track of in which 60° interval the program is presently operating, is set to equal 0 and may assume integer values from 0 to 5 in order to cover one cycle or 360°. A pulse index counter, with a value PINDEX keeps track of in which one-half triangle of the timing waveform within a 60° interval the program is operating and is set to equal zero.

From step 120 the program performs steps 121-122 by loading the TS counter 3d (FIG. 1A) with a predetermined number and starting countdown of TS timer 3d. The program then performs step 123 which samples and stores the values of the reference amplitude and reference frequency signals available at inputs 2a and 2b of microprocesser means 2 (FIG. 1A), respectively, in the memory (not shown) of microprocessor means 2, and also precomputes and stores data, e.g. the number (TNUM) of one-half triangles of the timing waveform 33 (FIG. 2B) in each 60° interval, which is a function of the reference or target frequency and other variables common to all three types of the trapezoidal waveform.

The program then performs step 124 which immediately causes it to perform step 125. Step 125 determines whether the internal flag to be set at step 250 has been set. If the flag has not been set the program proceeds to step 124 which again immediately causes it to perform step 125. The program will loop through steps 124 and 125 as long as the flag has not been set and a TS interrupt is not received. If the flag has been set, the program follows the Y path to step 126 which resets the flag and then to step 123 which again samples and stores the values of the reference amplitude and frequency signals. Thus at the end of each period of the reference waveform, the values of the reference amplitude and frequency are sampled.

Timer means 3 (FIG. 1A) which may be an AM 9513 type integrated circuit or the like manufactured by Advanced Micro Devices (AMD), Inc., comprises a number of timers 3a-3d, which is at least one more than the number of phases of the PWM control signal. A clock signal, available at input 3e thereof, is supplied to each timer from a source (not shown). The clock signal comprises a plurality of rapid transitions typically on the order of 1-2 MHz. By performing step 121, TS timer 3d is loaded with a number representing the duration of one-half triangle of timing waveform 33. For each count transition of the clock signal available at input 3e of timer means 3, the number stored in the counter 3d is decreased by one and thus the number loaded into TS counter 3d is related to the frequency of the clock signal. For example, for a 1000 Hz triangular timing wave, a one-half triangle duration of waveform 33 is 500 microseconds. Thus, for a 1 MHz clock having a counting period of one microsecond, the number 500 is stored initially in TS counter 3d; for a 500 kHz clock, the number 250 is stored therein; and for a 2 MHz clock, the number 1000 is stored therein. Other numbers may be analogously determined for initial storing in TS counter 3d. When the number in TS counter 3d is counted to zero, a TS interrupt signal is generated. The TS interrupt signal is provided to input 2c of microprocessor means 2, thereby initiating start step 128 of the interrupt service routine which allows the routine to begin at the start of each one-half triangle of the timing waveform 33. After generation of the TS interrupt signal, the TS timer is reloaded with a number representing the TS interval. For synchronization of the reference 50 and timing 33 signals shown in FIG. 2A, the 0° point of the trapezoid 30 and the starting point of the first period of the triangular timing waveform 33 are made to be coincident at point 34 in FIG. 2A internally in microprocessor 2.

Since the triangular timing waveform is formed from straight line segments, there will be different equations for these lines of the form $y_i = k_i x + b_i$, where $k_i$ is the slope and $b_i$ is the value of $y_i$ for $x = 0$. The values of $k_i$ and $b_i$, where i is the present number of the half-triangle of the timing waveform 33 within the 60° interval of the reference signal 50 under consideration, are computed as follows:

$$k_i = \frac{B}{TS} ; b_i = -(i-1)B \text{ for } i = 0, 2, 4 \ldots$$

$$k_i = -\frac{B}{TS} ; b_i = i \cdot B \text{ for } i = 1, 3, 5 \ldots$$

where B is the height of a triangle in the timing waveform 33 and TS is the length of the TS sampling interval in seconds.

The equations of the lines forming trapezoidal waveform 30 are of the same general form, $y_j = k_j x + b_j$ where $k_j$ is the slope and $b_j$ is the value of $y_j$ for $x = 0$, as the equations of the straight line segments of timing waveform 33. The values of $k_j$ and $b_j$, where j is equal to 1, 2 or 3 corresponding to type 1, 2 or 3 portions of the trapezoidal waveform 50, respectively, are computed as follows:

$$k_1 = \frac{0.866 \text{ V}}{TNUM \cdot TS} ; b_1 = 0$$

$$k_2 = 0; b = 0.866 \text{ V}$$

$$k_3 = -\frac{0.866 \text{ V}}{TNUM \cdot TS} ; b = 3 \cdot (0.866 \text{ V}),$$

where TNUM is the number of one-half-triangles of timing waveform 33 in each 60° interval and TS is the sampling interval.

Since the reference waveform 50 is approximated by a trapezoid 30, the determination of the switching points involves computing the intersection of two straight lines. The need to store or calculate a non-linear function, i.e. sin x, is eliminated, thus saving time and/or memory space.

For lower harmonic content of the PWM control signal, an integral number of triangles or complete cycles of timing waveform 33 must be contained in each 60° interval of the reference waveform 50. Thus, the frequency (and thereby the half-period TS) of the timing waveform 33 may be slightly altered to accommodate this restraint.

For each of the three modes which the trapezoidal waveform 30 assumes during the predetermined 60° intervals, performing each of program steps 130, 150, 170 computes a respective switching point interval for the extant one-half triangle of the timing waveform shown in FIG. 2B. A switching point interval (SPI), as shown in FIG. 2B is the interval from the beginning of a TS interrupt until an intersection of the timing 33 and trapezoidal 30 waveforms is detected. Therefore, the switching point interval will always be within the range $0 \leq SPI \leq TS$.

After computing the switching point intervals for types 1, 2 and 3 of trapezoidal waveform 30, performing steps 140, 160 and 180, respectively ,provides the switching point interval and counter select signals to inputs of first multiplexer means 5, shown in FIG. 1A. The counter select signal determines on which of pulses A, B or C output lines the SPI signal will be provided for supplying timers 3a, 3b or 3c, respectively, of timer means 3. The counter select signal is a function of the phase pointer which is indicative of in which 60° interval of the reference signal period the program is operating.

Pulses A, B and C at timers 3a-3c, respectively, of timer means 3 shown in FIG. 1A, are loaded into buffers (not shown) and at the next TS interrupt, indicating the end of a one-half triangle of the timing waveform, timers 3a, 3b, and 3c are loaded with pulses A, B and C, respectively, from the buffers. Timers 3a, 3b, 3c thereupon begin to count down and when zero is reached at any timer, an output signal is provided from that time to second multiplexer means 4. Sign A, sign B, and sign C signals supplied to second multiplexer means 4 from microprocessor means 2, determine whether the input signal of second multiplexer means 4 is available at, for example, the $\phi A+$ or $\phi A-$ output to be provided to switching elements 6, 7 of a phase of inverter 23. Sign A, sign B and sign C signals are a function of in which 60° interval the program is operating.

After performing step 180, the program performs step 190 by incrementing pulse index PINDEX by one. Performing conditional branch step 200 thereupon tests whether the 60° interval is ended by comparing the pulse index PINDEX with the variable TNUM-1 and ending the 60° interval when they are equal. If PINDEX and TNUM-1 are not equal, the program follows the N path to perform return from interrupt step 260 which returns it to step 124 to await the next TS interrupt signal, which will cause the program to perform step 128 as hereinabove explained. If PINDEX and TNUM-1 are equal, the program follows the Y path to perform step 210 by setting PINDEX equal to zero and then performs step 220 which increments the phase pointer by one. Conditional branch step 230 is then performed to test whether the period is ended, i.e. whether the phase pointer is equal to 5 (indicative of six 60° intervals having been computed). If the period is not ended, the program follows the N path to perform step 260 which returns it to step 124 to await another TS interrupt to start the interrupt routine. If the period is ended, the program follows the Y path to perform step 240 by setting the phase pointer equal to zero, and the program then performs step 250 to set an internal flag. Step 260 is then performed which returns the program to step 124 to await another TS interrupt to start the interrupt routine.

It is not necessary that the amplitude of the timing waveform 33 in FIG. 2B be greater than that of the trapezoidal waveform 30 during each cycle. In such a case, a phase control signal, for example $\phi A+$ of FIG. 1, may be turned on and not turned off again for many cycles of the timing waveform. This is known as square wave mode of operation and provides the maximum amplitude of the fundamental of the generated PWM signal.

Thus, a method for generating pulse width modulated control signals for power conditioning apparatus wherein the need for generation of lock-out intervals for the power conditioning apparatus is avoided has been described. Also described was a method for generating a pulse width modulated control signal wherein calculation of the intercept points between reference and timing waveforms is simplified.

Although the preferred embodiments of the present invention have been described and illustrated, other configurations and modifications will become apparent from the foregoing to one skilled in the art as for instance using analog circuitry to determine the intercept point of a reference and unipolar timing waveform. It is intended that the scope of this invention be limited only by the appended claims.

What is claimed is:

1. A method of generating a pulse width modulated (PWM) control signal for an electronic power converter having semiconductor switching elements in series between positive and negative DC buses and which has an output of variable amplitude and variable frequency, comprising the setps of:

modulating an approximated reference waveform having positive and negative polarities with a timing waveform having a frequency substantially greater than said reference waveform and the same polarity, in each half period, as said reference waveform;

calculating points of intersection of said waveforms to determine switching points of said control signal;

generating a train of PWM pulses each occurring at the start of an interval in which the magnitude of said timing waveform is less than said reference waveform and terminating at the end of the respective interval; and supplying said PWM pulses to the switching elements of said power converter to control its output, whereby simultaneous conduction of series-connected switching elements to short circuit the DC buses is prevented.

2. The method of claim 1 wherein said reference waveform is a linear approximation of a sine wave and said timing waveform is a triangular wave, and calculating points of intersection involves computing the intersection of two straight lines.

3. A method of generating a pulse width modulated control signal for an electronic power converter which has an output of variable amplitude and variable frequency comprising the steps of:

modulating a reference waveform having positive and negative polarities with a timing waveform having a higher frequency than said reference waveform and the same polarity, in each half period, as said reference waveform;

generating a train of width modulcated pulses each occurring at the start of an interval in which the magnitude of said timing waveform is less than the magnitude of said reference waveform, and terminating at the end of the respective interval; and supplying said pulses to the switching elements of said power converter to control its output;

wherein said reference waveform is a trapezoidal approximation of a sinusoidal waveform and said timing waveform is triangular, and the step of calculating points of intersection of said trapezoidal and triangular waveforms to determine the time boundaries of said pulses.

4. A method of generating a pulse width modulated (PWM) control signal for an electronic power inverter which has an output of variable amplitude and variable frequency comprising the setps of:

modulating a sinusoidal reference waveform having positive and negative polarities with a triangular timing waveform having a higher frequency than said reference waveform and the same polarity, in each half period, as said reference waveform;

generating a train of PWM pulses each occurring at the start of an interval in which the magnitude of said triangular waveform is less than the magnitude of said sinusoidal waveform, and terminating at the end of the respective interval; and supplying said PWM pulses to the switching elements of said power inverter to control its output;

wherein said sinusoidal reference waveform is approximated by a trapezoidal waveform, and the step of calculating in a microprocessor points of intersection of said trapezoidal and triangular waveforms to determine switching points of said control signal.

* * * * *